US010538139B2

(12) United States Patent
Kim et al.

(10) Patent No.: US 10,538,139 B2
(45) Date of Patent: Jan. 21, 2020

(54) HEAT EXCHANGER

(71) Applicant: Hanon Systems, Daejeon (KR)

(72) Inventors: Si Hyung Kim, Daejeon (KR); Dae Keun Park, Daejeon (KR); Seung Ho Baek, Daejeon (KR); Ho Lee, Daejeon (KR); Dong Gyun Kim, Daejeon (KR); Soo Byeong Nam, Daejeon (KR)

(73) Assignee: Hanon Systems, Daejeon (KR)

( * ) Notice: Subject to any disclaimer, the term of this patent is extended or adjusted under 35 U.S.C. 154(b) by 87 days.

(21) Appl. No.: 15/517,076

(22) PCT Filed: Nov. 4, 2015

(86) PCT No.: PCT/KR2015/011736
§ 371 (c)(1),
(2) Date: Apr. 5, 2017

(87) PCT Pub. No.: WO2016/072719
PCT Pub. Date: May 12, 2016

(65) Prior Publication Data
US 2017/0297408 A1  Oct. 19, 2017

(30) Foreign Application Priority Data

Nov. 4, 2014  (KR) .................. 10-2014-0151833
Nov. 3, 2015  (KR) .................. 10-2015-0154000

(51) Int. Cl.
B60H 1/00   (2006.01)
(52) U.S. Cl.
CPC ..... B60H 1/00321 (2013.01); B60H 1/00571 (2013.01); B60H 1/00807 (2013.01); B60H 1/00899 (2013.01)
(58) Field of Classification Search
CPC .... F28D 1/0417; F28D 9/0093; F28D 7/0066; F28D 7/0075; F28D 1/03; F28F 2210/04;
(Continued)

(56) References Cited

U.S. PATENT DOCUMENTS 4,327,802 A * 5/1982 Beldam ............... F28D 1/0333
                                                              165/153
8,443,869 B2 * 5/2013 Lavanchy ............. F28B 1/02
                                                              165/145
(Continued)

FOREIGN PATENT DOCUMENTS

FR    2846736 A1 *  5/2004  ........... F01P 9/06
JP  2000171177 A *  6/2000  ........... F28D 9/005
(Continued)

OTHER PUBLICATIONS

International Search Report issued in PCT/KR2015/011736 dated Feb. 17, 2016.

Primary Examiner — Tho V Duong
(74) Attorney, Agent, or Firm — Norton Rose Fulbright US LLP; James R. Crawford

(57) ABSTRACT

Disclosed is a heat exchanger capable of exchanging heat between coolant and refrigerant of different kinds in one device and providing an effective heat exchange ratio between the coolant and the refrigerant. The heat exchanger includes a refrigerant flow path having a refrigerant inlet and a refrigerant outlet, and a coolant flow path through which coolant flows to exchange heat with the refrigerant. The coolant flow path includes a first coolant flow path where first coolant flows, and a second coolant flow path where second coolant with a different kind from the first coolant flows. The heat exchanger is partitioned into a first heat exchange section, in which the first coolant exchanges heat with the refrigerant and a second heat exchange section, in which the second coolant exchanges heat with the refrigerant, so that the heat exchange in the first heat exchange section and the heat exchange in the second heat exchange are carried out independently.

8 Claims, 10 Drawing Sheets

(58) Field of Classification Search
CPC .............. F28F 2210/06; B60H 1/00278; B60H 1/00342; B60H 1/004; B60H 1/00571; B60H 1/00807; B60H 1/00899; B60H 1/00907

See application file for complete search history.

(56) References Cited

U.S. PATENT DOCUMENTS

| | | | | |
|---|---|---|---|---|
| 9,494,350 B2 * | 11/2016 | Kadle | ..................... | F25B 1/00 |
| 2012/0216562 A1 | 8/2012 | Kadle et al. | | |
| 2013/0140017 A1 * | 6/2013 | Kim | ..................... | F28F 27/02 |
| | | | | 165/299 |

FOREIGN PATENT DOCUMENTS

| | | | | |
|---|---|---|---|---|
| JP | 2006029767 A * | 2/2006 | ........... | B01D 5/0015 |
| KR | 20100130806 A | 12/2010 | | |
| KR | 20130026872 A | 3/2013 | | |
| KR | 20130054048 A | 5/2013 | | |
| KR | 101318625 B1 | 10/2013 | | |
| WO | WO-0034729 A1 * | 6/2000 | ............. | F28D 9/005 |
| WO | WO-2009068547 A1 * | 6/2009 | ......... | B60H 1/00342 |

* cited by examiner

PRIOR ART

PRIOR ART

— HEAT EXCHANGER —

This application is a § 371 of International Application No. PCT/KR2015/011736 filed on Nov. 4, 2015, and claims priority from Korean Patent Application Nos. 10-2014-0151833 filed on Nov. 4, 2014 and 10-2015-0154000 filed on Nov. 3, 2015.

FIELD OF THE INVENTION

The present invention relates to a heat exchanger, and more particularly, to a water cooled condenser type heat exchanger which exchanges heat between coolant and refrigerant.

BACKGROUND ART

In general, an air conditioner for a vehicle is a device for cooling or heating the interior of a vehicle by cooling or heating while introducing outside air of the vehicle to the interior of the vehicle or circulating inside air of the vehicle. The air conditioner for the vehicle includes an evaporator disposed inside an air-conditioning case for a cooling action, a heater core for a heating action, and a mode converting door for selectively blowing the air cooled by the evaporator or the air heated by the heater core to each area of the vehicle.

Korean Patent No. 10-1151758 discloses a plate type heat exchanger. FIG. 1 is a perspective view of a water cooled heat exchanger according to a related art, and FIG. 2 is a schematic diagram showing a configuration of the water cooled heat exchanger according to the related art.

Referring to FIGS. 1 and 2, the conventional water cooled heat exchanger 9 includes a plurality of plates 1 stacked on one another, a refrigerant inlet 2 for introducing refrigerant therethrough, a refrigerant outlet 3 for discharging refrigerant therethrough, a coolant inlet 4 for introducing coolant therethrough, and a coolant outlet 5 for discharging coolant therethrough, which are disposed at one side thereof. The plates 1 are stacked on one another to form a refrigerant channel and a coolant channel therein.

The refrigerant flowing into the heat exchanger through refrigerant inlet 2 flows through the refrigerant channel formed by the plates 1 and is discharged out through the refrigerant outlet 3, so a refrigerant flow path 7 as illustrated in FIG. 2 is formed. Moreover, the coolant flowing into the heat exchanger through the coolant inlet 4 flows through the coolant channel formed by the plates 1 and is discharged out through the coolant outlet 5, so a coolant flow path 8 as illustrated in FIG. 2 is formed. The refrigerant of the refrigerant flow path 7 and the coolant of the coolant flow path 8 exchange heat with each other.

The conventional water cooled heat exchanger 9 performs heat exchange with refrigerant using waste heat of electronic unit coolant, which flowed various electronic units through the coolant flow path 8.

However, in case of an electric vehicle which generates lots of waste heat from coolant of a stack side, the conventional water cooled heat exchanger is disadvantageous in that it may not use the waste heat of the coolant of the stack side due to its structure that is not capable of exchanging heat between coolant and refrigerant of different kinds.

Moreover, in order to apply a structure capable of exchanging heat between coolant and refrigerant of different kinds, studies for providing an effective heat exchange ratio between coolant and refrigerant of different kinds are required.

SUMMARY OF THE INVENTION

Accordingly, the present invention has been made in view of the above-mentioned problems occurring in the prior art, and it is an object of the present invention to provide a heat exchanger which may exchange heat between coolant and refrigerant of different kinds in one device and provide an effective heat exchange ratio between the coolant and the refrigerant of different kinds.

To accomplish the above object, according to the present invention, there is provided a heat exchanger, which includes a refrigerant flow path having a refrigerant inlet for introducing refrigerant into the heat exchanger and a refrigerant outlet for discharging refrigerant, and a coolant flow path through which coolant flows to exchange heat with the refrigerant flowing through the refrigerant flow path. The coolant flow path includes a first coolant flow path through which first coolant flows, and a second coolant flow path through which second coolant with a kind different from that of the first coolant flows. The heat exchanger is partitioned into a first heat exchange section, in which the first coolant of the first coolant flow path exchanges heat with the refrigerant and a second heat exchange section, in which the second coolant of the second coolant flow path exchanges heat with the refrigerant, and the heat exchange in the first heat exchange section and the heat exchange in the second heat exchange are carried out independently.

Moreover, a plurality of plates are stacked on one another to form the refrigerant flow path, the first coolant flow path and the second coolant flow path therein, and a partition plate is disposed between the plates to partition the first coolant flow path from the second coolant flow path.

Furthermore, a first coolant inlet for introducing the first coolant into the heat exchanger and a first coolant outlet for discharging the first coolant are disposed at one side in the stacked direction of the plates, and a second coolant inlet for introducing the second coolant into the heat exchanger and a second coolant outlet for discharging the second coolant are disposed at the other side in the stacked direction of the plates. The refrigerant inlet and the refrigerant out are disposed at the opposite sides in the stacked direction of the plates to form a 2-pass structure.

Additionally, a refrigerant passing hole is formed in the partition plate so that the refrigerant passed through the first heat exchange section flows to the second heat exchange section.

Moreover, a ratio of a heat exchange area between the first coolant and the refrigerant in the first heat exchange section to a heat exchange area between the second coolant and the refrigerant in the second heat exchange section is controlled according to a temperature difference between the first coolant and the second coolant.

Furthermore, the first coolant is a stack coolant, and the second coolant is an electronic unit coolant.

Additionally, when temperature of the stack coolant and temperature of the electronic unit coolant are equal, a heat exchange area of the stack coolant is about 65%, and a heat exchange area of the electronic unit coolant is about 35%.

In addition, if temperature of the stack coolant is 10 degrees higher than that of the electronic unit coolant, the heat exchange area of the stack coolant and the heat exchange area of the electronic unit coolant is equal to each other.

The heat exchanger according to an exemplary embodiment of the present invention may realize a triple heat exchanger by performing heat exchange between coolant and refrigerant of different kinds in a single heat exchanger, enhance heat exchange efficiency utilizing the coolant of the stack side which is relatively high in waste heat, and control a stage ratio of the water cooled condenser according to heat radiation amounts of the stack side and the electronic unit side, thereby obtaining the optimum heat exchange effect.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, a technical configuration of a heat exchanger according to exemplary embodiments of the present invention will be described with reference to the accompanying drawings.

Figure 1:
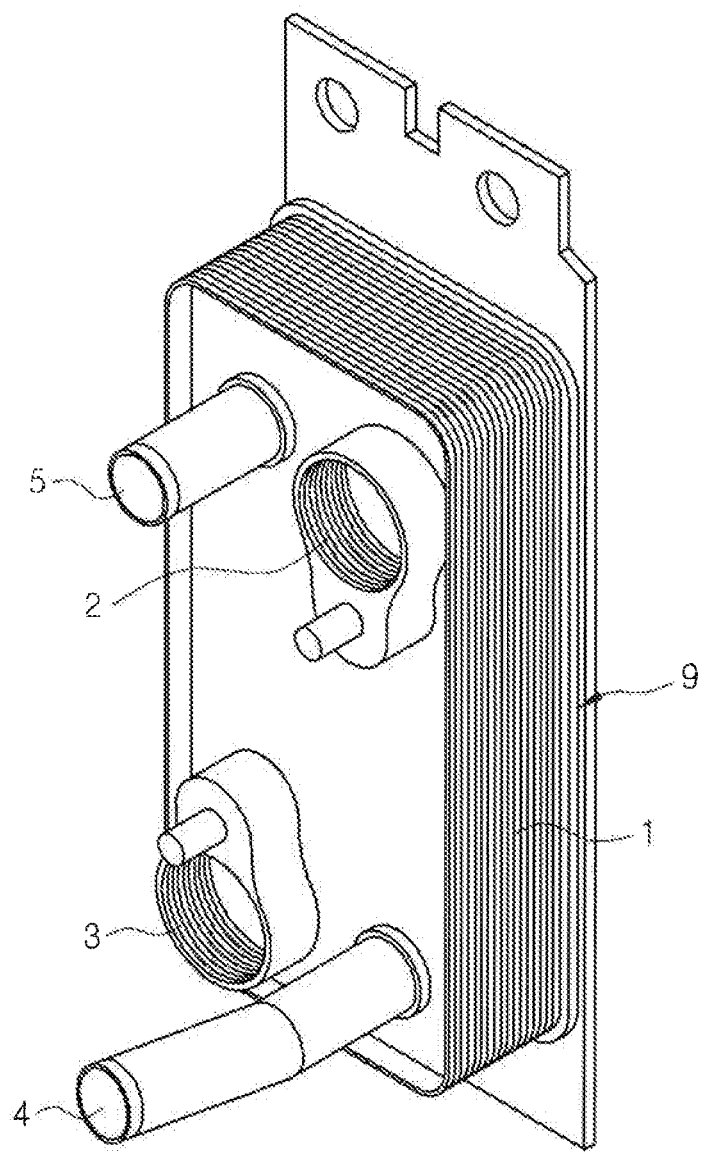
FIG. 1 is a perspective view of a water cooled heat exchanger according to a related art.
Figure 2:
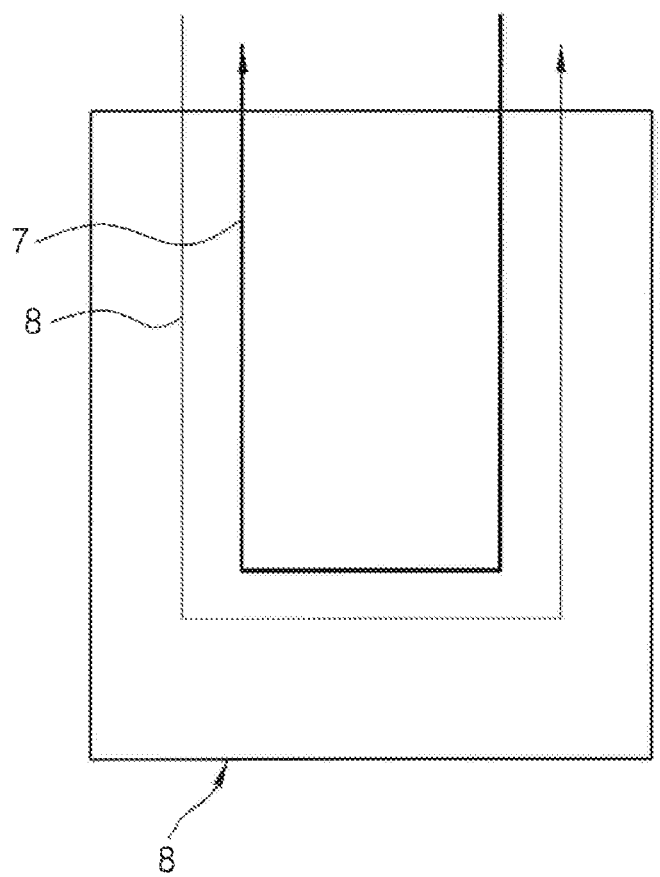
FIG. 2 is a schematic diagram showing a configuration of the water cooled heat exchanger according to the related art.
Figure 3:
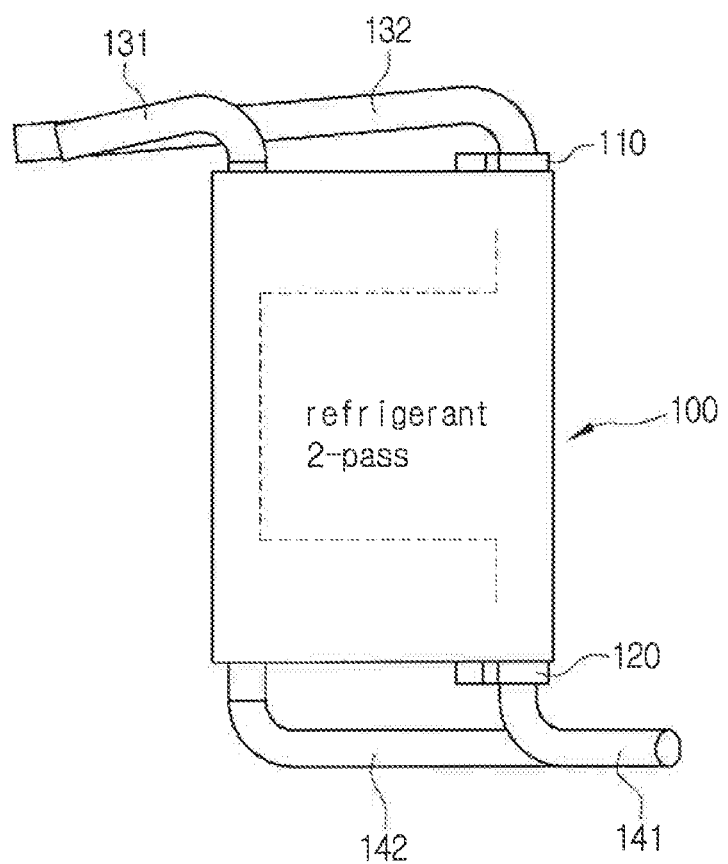
FIG. 3 is a view showing a heat exchanger according to an exemplary embodiment of the present invention.
Figure 4:
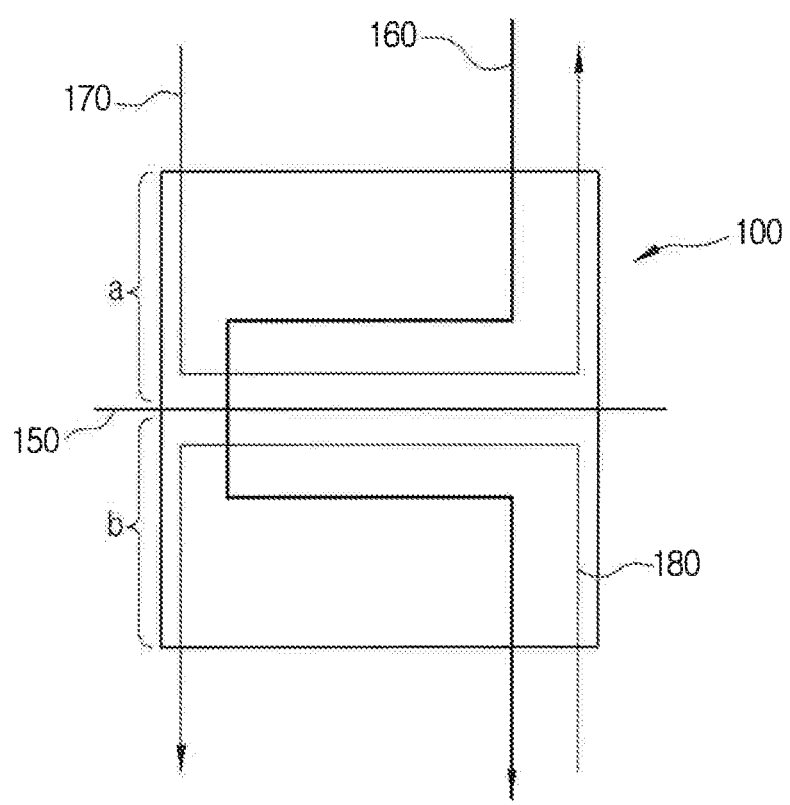
FIG. 4 is a schematic diagram showing a configuration of the heat exchanger according to the exemplary embodiment of the present invention.
Figure 5:
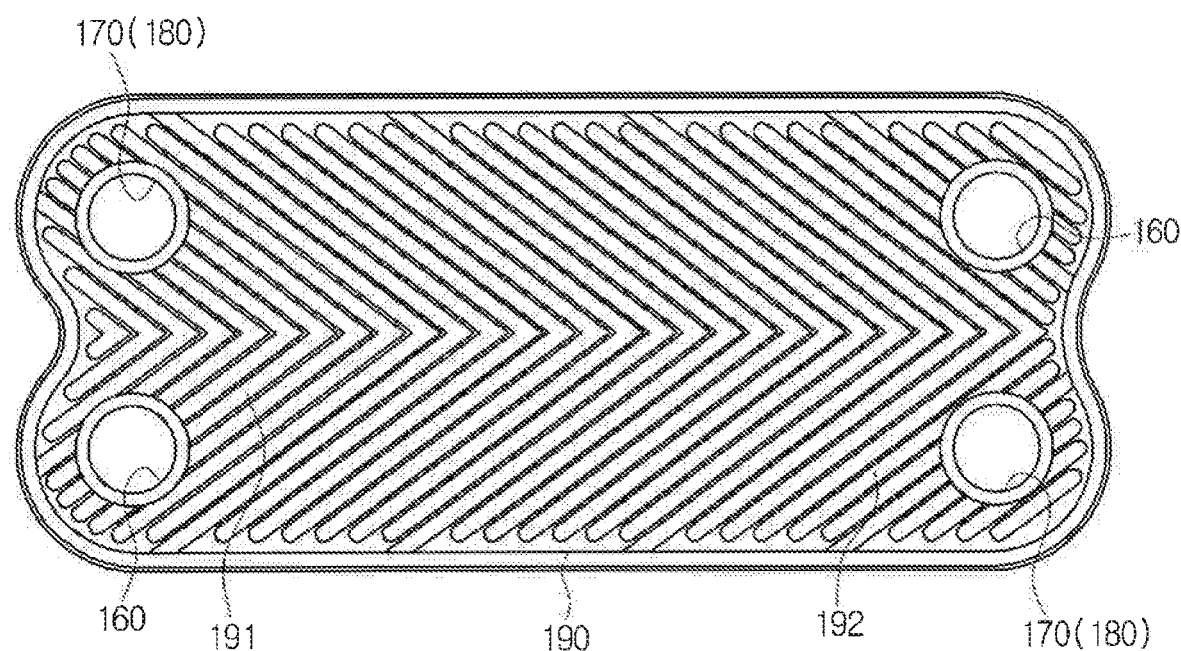
FIG. 5 is a view showing a plate of the heat exchanger according to the exemplary embodiment of the present invention.
Figure 6:
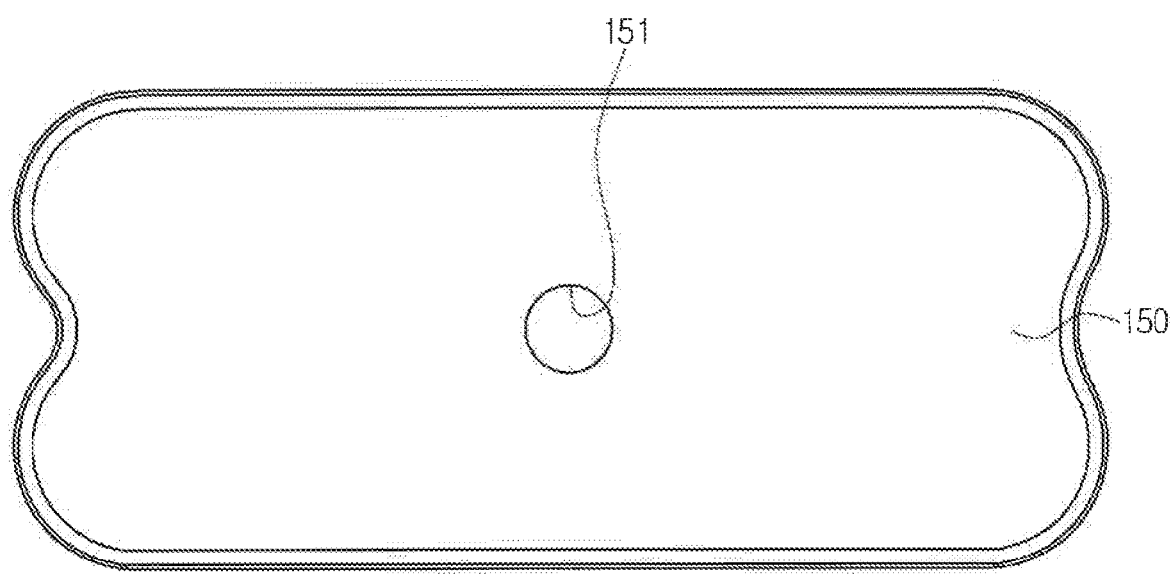
FIG. 6 is a view showing a partition plate of the heat exchanger according to the exemplary embodiment of the present invention.

FIG. 3 is a view showing a heat exchanger according to an exemplary embodiment of the present invention, FIG. 4 is a schematic diagram showing a configuration of the heat exchanger according to the exemplary embodiment of the present invention, FIG. 5 is a view showing a plate of the heat exchanger according to the exemplary embodiment of the present invention, and FIG. 6 is a view showing a partition plate of the heat exchanger according to the exemplary embodiment of the present invention.

In the following description, a vertical direction in FIG. 3 is a "stacked direction of plates".

As shown in FIGS. 3 to 6, a heat exchanger 100 according to an exemplary embodiment of the present invention is formed by a plurality of plates 190 stacked on one another. Each plate 190 has a plate form with a predetermined thickness, and has a plurality of diagonal flow channel to form paths through which refrigerant and coolant flow when the plates 190 are stacked on one another.

In other words, the plates 190 are formed in such a way that a refrigerant line 191 and a coolant line 192 are in the neighborhood with each other, and refrigerant flowing through the refrigerant line 191 and coolant flowing through the coolant line 192 exchange heat with each other. However, the heat exchanger is not restricted to the aforementioned form and may be realized in various forms.

The heat exchanger 100 forms a refrigerant flow path 160 having a refrigerant inlet 110 for introducing refrigerant thereinto and a refrigerant outlet 120 for discharging refrigerant. Furthermore, the heat exchanger 100 includes a coolant flow path, and coolant flowing through the coolant flow path exchanges heat with the refrigerant flowing through the refrigerant flow path 160.

The coolant flow path includes a first coolant flow path 170 through which first coolant flows, and a second coolant flow path 180 through which second coolant flowing in another area relative to the first coolant flows. In this instance, in case of an electric vehicle, the first coolant may be coolant of a stack side and the second coolant may be electronic unit coolant for a motor and various electronic units. Therefore, the heat exchanger according to the exemplary embodiment of the present invention may perform heat exchange with refrigerant using waste heat of the coolant lines of different two kinds.

The heat exchanger 100 is partitioned into a first heat exchange section a, in which the first coolant of the first coolant flow path 170 exchanges heat with the refrigerant, and a second heat exchange section b, in which the second coolant of the second coolant flow path 180 exchanges heat with the refrigerant. The heat exchange between the first coolant and the refrigerant in the first heat exchange section a and the heat exchange between the second coolant and the refrigerant in the second heat exchange section b are carried out independently.

Through the aforementioned structure, because the coolant and the refrigerant of different kinds exchange heat with each other in the single heat exchanger 100, a triple heat exchanger may be realized and may enhance heat exchange efficiency utilizing the stack side coolant which is relatively high in waste heat.

The plates 190 are stacked on one another to form the refrigerant flow path 160, the first coolant flow path 170, and the second coolant flow path, which are formed therein. Additionally, a partition plate 150 is disposed between the plates 190 to partition the first coolant flow path 170 from the second coolant flow path 180. The partition plate 150 has a relatively simple structure, such that the heat exchange between the coolant and the refrigerant may be achieved independently in the first heat exchange section a and the second heat exchange section b.

Therefore, the refrigerant introduced through the refrigerant inlet 110 first exchanges heat with the first coolant in the first heat exchange section a, and then, flows to the second heat exchange section b to second exchange heat with the second coolant in the second heat exchange section b. After that, the refrigerant is discharged out through the refrigerant outlet 120. Finally, the heat exchange between the coolant and the refrigerant of different kinds is achieved sequentially to provide effective heat exchange.

In this instance, a refrigerant passing hole 151 is formed in the partition plate 150 to make the refrigerant flowed the first heat exchange section a flow in the second heat exchange section b. The refrigerant passing hole 151 makes the refrigerant channel of the first heat exchange section a communicate with the refrigerant channel of the second heat exchange section b.

Figure 7:
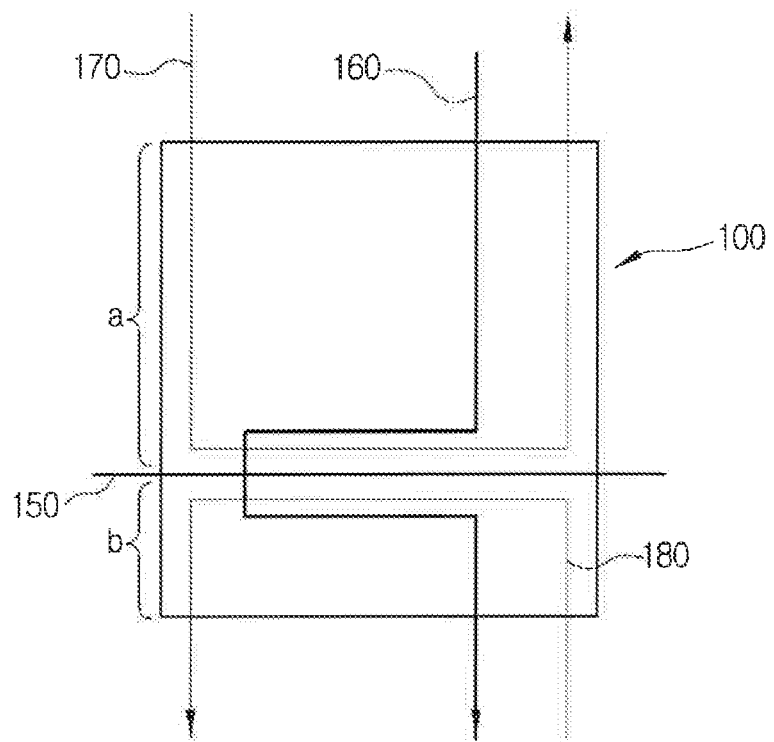
FIGS. 7 and 8 are schematic diagrams respectively showing configurations of heat exchangers having different heat exchange ratios according to modifications of the present invention.
Figure 8:
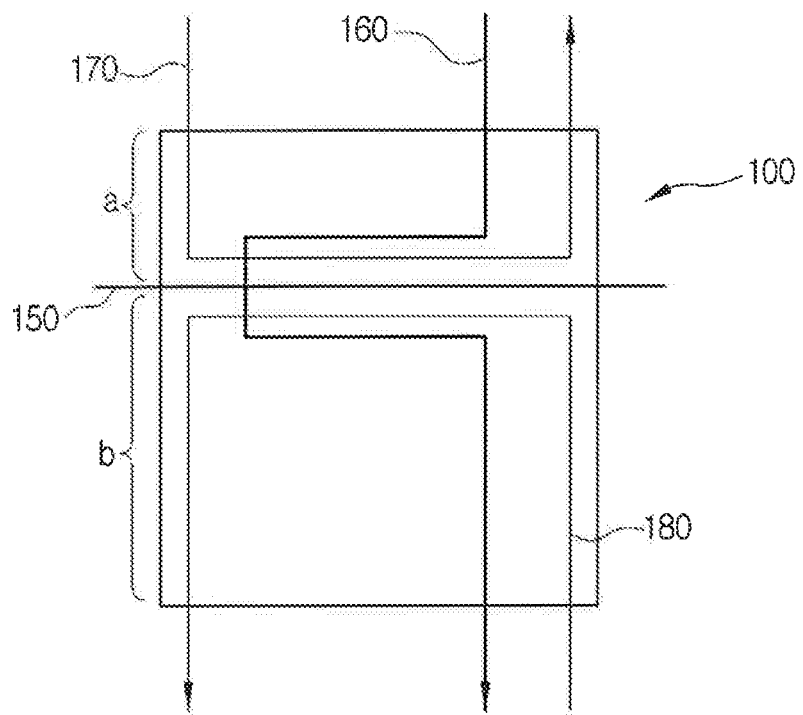

In the meantime, FIGS. 7 and 8 are schematic diagrams respectively showing configurations of heat exchangers having different heat exchange ratios according to modifications of the present invention.

The heat exchanger 100 controls a ratio of a heat exchange area between the first coolant and the refrigerant in the first heat exchange section a to a heat exchange area between the second coolant and the refrigerant in the second heat exchange section b according to a temperature difference between the first coolant and the second coolant. A position of the partition plate 150 in a stacked direction, namely, a ratio of top and bottom stages of the heat exchanger, is controlled according to the temperature difference between the first coolant, namely, the stack side coolant, and the second coolant, namely, the electronic unit coolant, through calculation of a heat radiation amount.

For example, in case of an electric vehicle, such as a pollution-free vehicle, the temperature difference between the stack side coolant and the electronic unit coolant is formed to be about 15° C., and in this instance, a ratio between the first heat exchange section a and the second heat exchange section b is formed to be 35:65. Even if there is no difference in coolant temperature, the ratio between the first heat exchange section a and the second heat exchange section b may be formed to be 65:35.

In other words, when temperature of the stack side coolant and temperature of the electronic unit coolant are equal, a heat exchange area of the stack side coolant is about 65%, and a heat exchange area of the electronic unit coolant is about 35%. Moreover, if the coolant temperature of the stack side coolant is 10 degrees higher than the coolant temperature of the electronic unit coolant, the heat exchange area of the stack side coolant and the heat exchange area of the electronic unit coolant may be formed to be equal to each other.

FIG. 7 illustrates that the first heat exchange section a is larger than the second heat exchange section b and the heat exchange area between the first coolant and the refrigerant is larger than the heat exchange area between the second coolant and the refrigerant, and FIG. 8 illustrates that the first heat exchange section a is smaller than the second heat exchange section b and the heat exchange area between the first coolant and the refrigerant is smaller than the heat exchange area between the second coolant and the refrigerant.

As described above, the heat exchanger according to the exemplary embodiment of the present invention controls the stage ratio of the water cooled condenser according to the heat radiation amounts of the stack side and the electronic unit side so as to obtain the optimum heat exchange effect.

Figure 9:
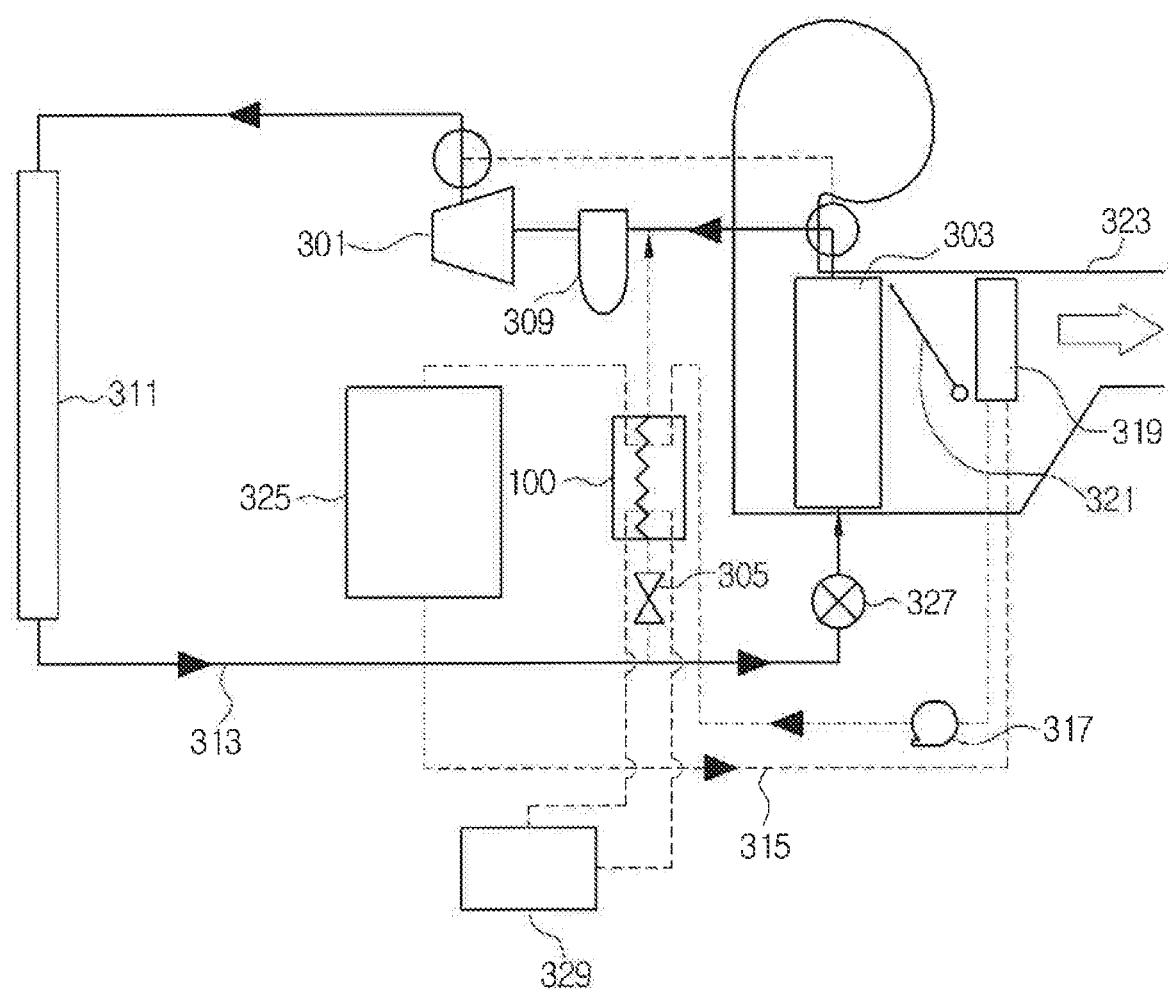
FIG. 9 is a configurative view showing a cooling mode of a heat pump system for a vehicle to which the heat exchanger according to the exemplary embodiment of the present invention is applied.
Figure 10:
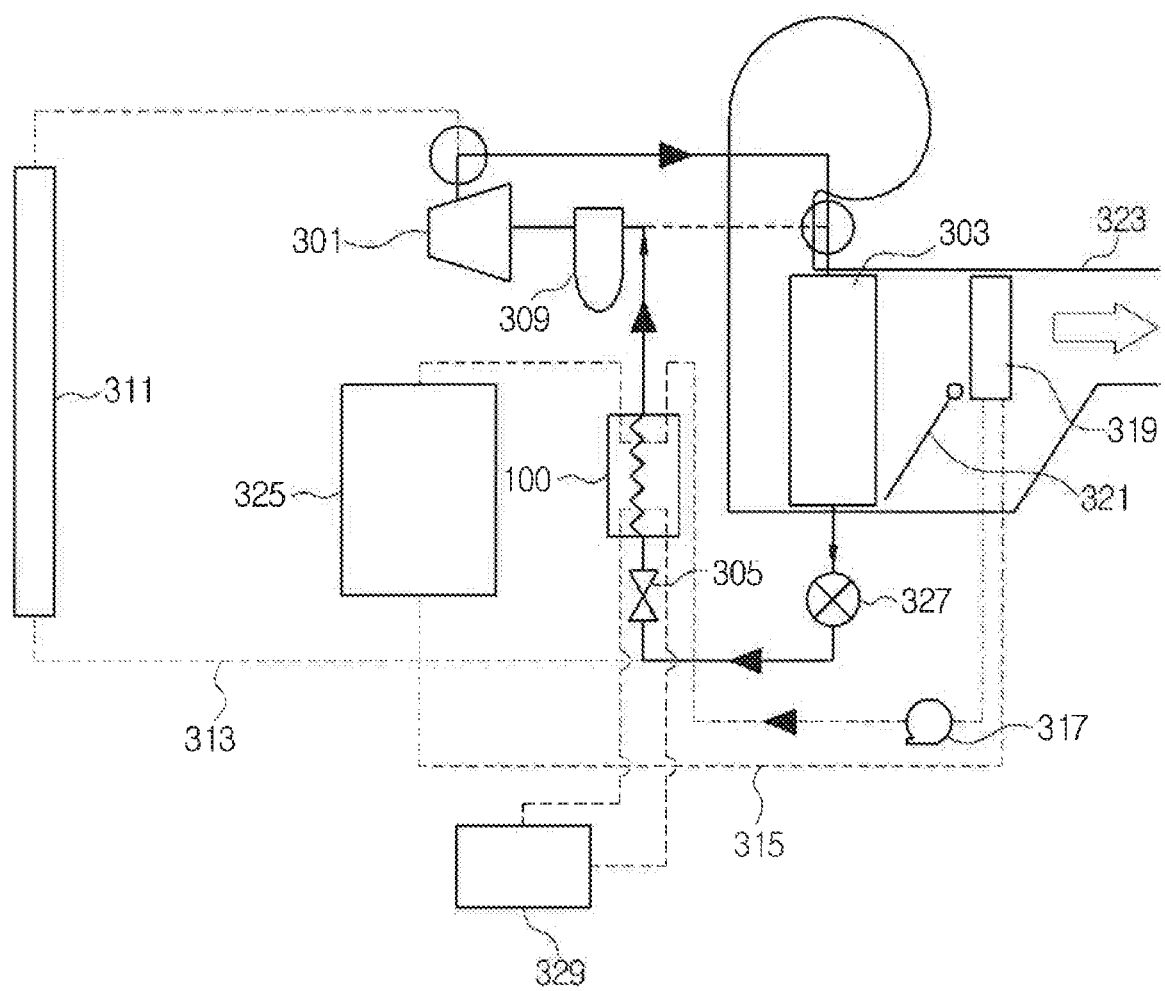
FIG. 10 is a configurative view showing a heating mode of the heat pump system for a vehicle to which the heat exchanger according to the exemplary embodiment of the present invention is applied.

FIG. 9 is a configurative view showing a cooling mode of a heat pump system for a vehicle to which the heat exchanger according to the exemplary embodiment of the present invention is applied, and FIG. 10 is a configurative view showing a heating mode of the heat pump system for a vehicle to which the heat exchanger according to the exemplary embodiment of the present invention is applied.

Referring to FIGS. 9 and 10, a heat pump system for a vehicle according to an exemplary embodiment of the present invention includes a refrigerant circulation line 313, a compressor 301, an exterior heat exchanger 311, an orifice 327, an evaporator 303, a coolant circulation line 315, a heat exchanger 100, namely, a coolant-refrigerant heat exchanger, and a heater core 319.

The compressor 301 is disposed on the refrigerant circulation line 313 to compress and discharge refrigerant. An accumulator 309 is mounted at the upstream side of the compressor 301 in a refrigerant flow direction. The accumulator 309 separates gas-phase refrigerant and liquid-phase refrigerant from refrigerant, which will be supplied to the compressor 301, and supplies only the gas-phase refrigerant to the compressor 301. The exterior heat exchanger 311 is mounted outside of an air-conditioning case 323 and exchanges heat between the refrigerant circulating the refrigerant circulation line 313 and outdoor air.

The orifice 327 is to throttle the refrigerant flowing through the refrigerant circulation line 313, and is arranged between the exterior heat exchanger 311 and the evaporator 303. The evaporator 303 is mounted inside the air-conditioning case 323 to exchange heat between inside air of the air-conditioning case 323 and the refrigerant flowing through the refrigerant circulation line 313. The coolant circulation line 315 is a path through which the coolant passing a stack 325, and the coolant flowing through the coolant circulation line 315 exchanges heat with the refrigerant flowing through the refrigerant circulation line 313. A water pump 317 for forcedly circulating the coolant is disposed on the coolant circulation line 315.

The heat exchanger 100 may be a coolant-refrigerant chiller, and has the same structure as illustrated in FIGS. 3 and 4. The heat exchanger 100 exchanges heat between the refrigerant flowing through the refrigerant circulation line 313 and the coolant flowing through the coolant circulation line 315. The heater core 319 is mounted on the coolant circulation line 315 and is arranged inside the air-conditioning case 323 to exchange heat between inside air of the air-conditioning case 323 and the coolant flowing through the coolant circulation line 315. The evaporator 303 and the heater core 319 are sequentially disposed inside the air-conditioning case 323 in the air flow direction, and a temperature-adjusting door 321 is disposed between the evaporator 303 and the heater core 319.

Referring to FIG. 9, in a cooling mode, the refrigerant discharged from the compressor 301 passes a three-way valve, and exchanges heat with outdoor air in the exterior heat exchanger 311. After that, the refrigerant passes the orifice 327, exchanges heat with inside air of the air-conditioning case 323 while passing through the evaporator 303, and then, circulates the compressor 301 after passing through the three-way valve and the accumulator 309. At the same time, the coolant flowing through the coolant circulation line 315 circulates the coolant-refrigerant heat exchanger 100 after passing the heater core 319, and the coolant circulating the heat exchanger 100 exchanges heat with the refrigerant circulating through the refrigerant circulation line 313. The coolant passed the coolant-refrigerant heat exchanger 100 circulates the heater core 319 again after passing the stack 325.

Moreover, referring to FIG. 10, in a heating mode, the refrigerant discharged from the compressor 301 exchanges heat with the inside air of the air-conditioning case 323 while passing through the evaporator 303 after passing the three-way valve, and then, passes through the orifice 327, a two-way valve 305, and the coolant-refrigerant heat exchanger 100 in order. After that, the refrigerant passes through the accumulator 309, and then, circulates the compressor 301. At the same time, the coolant flowing through the coolant circulation line 315 circulates the coolant-refrigerant heat exchanger 100 after passing the heater core 319, and the coolant circulating the coolant-refrigerant heat exchanger 100 exchanges heat with the refrigerant circulating through the refrigerant circulation line 313. The coolant passed the coolant-refrigerant heat exchanger 100 circulates the heater core 319 again after passing the stack 325. In the heating mode, refrigerant heat is radiated from the evaporator 303 to act as heat for heating, and is used as evaporation energy of refrigerant by recovering waste heat of the stack 325 through the coolant-refrigerant heat exchanger 100.

The heat exchanger 100 is configured so that the refrigerant flowing through the refrigerant flow path 160 first exchanges heat with the coolant, which is higher in temperature, of the first coolant and the second coolant flowing through the coolant flow path. As an example, when temperature of the stack side coolant is about 60° C. and temperature of the electronic unit coolant is about 40° C., the refrigerant flows through the refrigerant flow path 160 in the direction illustrated in FIG. 4. The refrigerant absorbs heat by first exchanging heat with the first coolant with temperature of about 60° C., and then, absorbs heat by exchanging heat with the second coolant with temperature of about 40° C. The refrigerant lowers temperature of the refrigerant by finally exchanging heat with the coolant with lower temperature in the heat exchanger 100 so as to enhance cooling efficiency.

Figure 11:
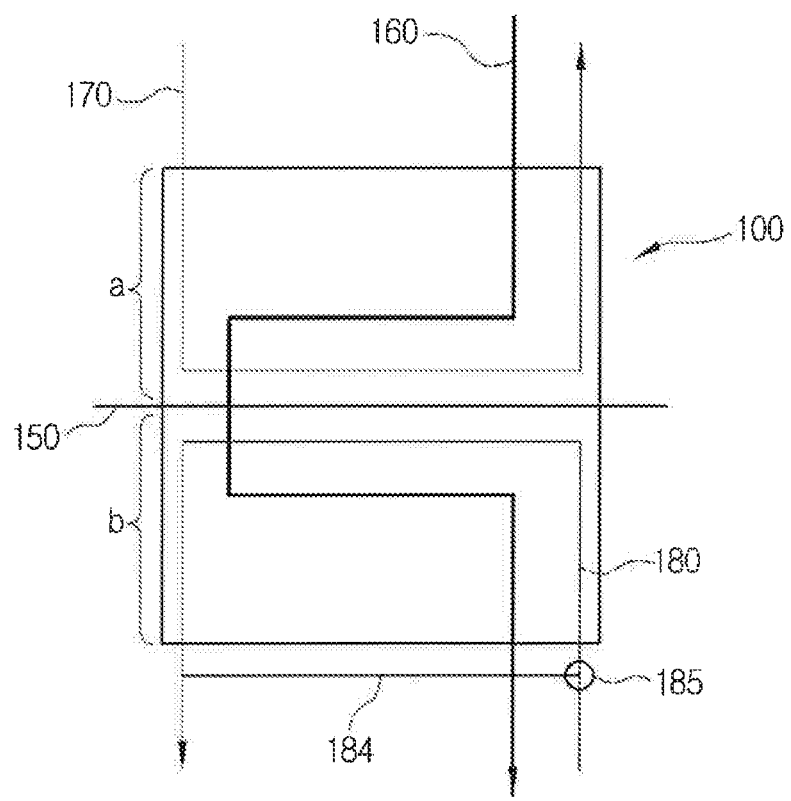
FIG. 11 is a schematic diagram showing a configuration of a heat exchanger according to a modification of FIG. 4.

FIG. 11 is a schematic diagram showing a configuration of a heat exchanger according to a modification of FIG. 4. Referring to FIG. 11, the heat exchanger 100 includes a refrigerant flow path 160 and a coolant flow path, and coolant flowing through the coolant flow path exchanges heat with refrigerant flowing through the refrigerant flow path 160. The coolant flow path includes a first coolant flow path 170 through which first coolant flows and a second coolant flow path 180 through which second coolant with a kind different from the first coolant flows. The heat exchanger 100 is partitioned into a first heat exchange section a, in which the first coolant of the first coolant flow path 170 exchanges heat with the refrigerant, and a second heat exchange section b, in which the second coolant of the second coolant flow path 180 exchanges heat with the refrigerant.

The heat exchanger 100 includes a bypass channel 184. The bypass channel 184 is formed at the second coolant flow path 180, and bypasses the coolant introduced into the heat exchanger 100 to prevent the coolant from flowing into the heat exchanger 100. The bypass channel 184 is branched at the upstream side of an inlet of the second coolant flow path 180 and is connected to the downstream side of an outlet. A valve 185 may be disposed at the branch portion to selectively control the coolant to flow toward the heat exchanger or bypass the coolant.

In other words, referring to FIGS. 9 and 10, in the cooling mode, the refrigerant of the heat exchanger 100 radiates heat, exchanges heat with the first coolant, and then, exchanges heat with the second coolant. Moreover, in the heating mode, the refrigerant of the heat exchanger 100 absorbs heat and the coolant of the second coolant flow path 180 is bypassed, so that the refrigerant exchanges heat only with the first coolant. In the heat exchanger 100, the coolant flowing through the second coolant flow path 180 is bypassed and does not exchange heat with the refrigerant so as to prevent deterioration in heating efficiency.

In the meantime, in the aforementioned exemplary embodiment, it is described that, in case of the electric vehicle, the first coolant may be stack side coolant and the second coolant may be electronic unit coolant for a motor and various electronic units, but the present invention is not limited thereto. The first coolant may be coolant which flows different heat sources, such as a stack, a battery and others, according to kinds of vehicles, such as electric vehicles, hybrid vehicles and so on.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

What is claimed is:

1. A heat exchanger, which includes a refrigerant flow path having a refrigerant inlet for introducing refrigerant into the heat exchanger and a refrigerant outlet for discharging refrigerant, and a coolant flow path through which coolant flows to exchange heat with the refrigerant flowing through the refrigerant flow path, wherein the coolant flow path includes a first coolant flow path through which first coolant flows, and a second coolant flow path through which second coolant flowing in another place relative to the first coolant flows, and wherein the heat exchanger is partitioned into a first heat exchange section, in which the first coolant of the first coolant flow path exchanges heat with the refrigerant and a second heat exchange section, in which the second coolant of the second coolant flow path exchanges heat with the refrigerant, and the heat exchange in the first heat exchange section and the heat exchange in the second heat exchange are carried out independently, wherein the refrigerant flowing through the refrigerant flow path first exchanges heat with the coolant, which is higher in temperature, of the first coolant and the second coolant, wherein the refrigerant first absorbs heat by a heat exchange with the first coolant and then, second absorbs heat by a heat exchange with the second coolant;

wherein a bypass channel is disposed on at least one of the first coolant flow path and the second coolant flow path to bypass the coolant; and wherein, in a cooling mode that the refrigerant radiates heat, the refrigerant exchanges heat with the second coolant after exchanging heat with the first coolant, and wherein, in a heating mode that the refrigerant absorbs heat, the coolant of the second coolant flow path exchanges heat only with the first coolant after being bypassed.

2. The heat exchanger according to claim 1, wherein a plurality of plates are stacked on one another to form the refrigerant flow path, the first coolant flow path and the second coolant flow path therein, and wherein a partition plate is disposed between the plates to partition the first coolant flow path from the second coolant flow path.

3. The heat exchanger according to claim 2, wherein a first coolant inlet for introducing the first coolant into the heat exchanger and a first coolant outlet for discharging the first coolant are disposed at one side in the stacked direction of the plates, and a second coolant inlet for introducing the second coolant into the heat exchanger and a second coolant outlet for discharging the second coolant are disposed at the other side in the stacked direction of the plates, and wherein the refrigerant inlet and the refrigerant out are disposed at the opposite sides in the stacked direction of the plates to form a 2-pass structure.

4. The heat exchanger according to claim 3, wherein a refrigerant passing hole is formed in the partition plate so that the refrigerant passed through the first heat exchange section flows to the second heat exchange section.

5. The heat exchanger according to claim 1, wherein a ratio of a heat exchange area between the first coolant and the refrigerant in the first heat exchange section to a heat exchange area between the second coolant and the refrigerant in the second heat exchange section is controlled according to a temperature difference between the first coolant and the second coolant.

6. The heat exchanger according to claim 1, wherein the first coolant is a stack coolant and the second coolant is an electronic unit coolant.

7. The heat exchanger according to claim 6, wherein, when temperature of the stack coolant is 10 degrees higher than that of the electronic unit coolant, the heat exchange area of the stack coolant and the heat exchange area of the electronic unit coolant is equal to each other.

8. The heat exchanger according to claim 1, wherein the refrigerant flowing through the refrigerant flow path first exchanges heat with the coolant, which is higher in temperature, of the first coolant and the second coolant.

* * * * *